United States Patent [19]

Carr, Jr. et al.

[11] 4,126,798
[45] Nov. 21, 1978

[54] SUPERCONDUCTIVE WINDING

[75] Inventors: Walter J. Carr, Jr.; Daniel W. Deis, both of Pittsburgh, Pa.

[73] Assignee: Westinghouse Electric Corp., Pittsburgh, Pa.

[21] Appl. No.: 801,481

[22] Filed: May 31, 1977

Related U.S. Application Data

[63] Continuation of Ser. No. 538,289, Jan. 2, 1975, now Defensive Publication No. T945,002.

[51] Int. Cl.² .............................................. H02K 3/48
[52] U.S. Cl. .................................... 310/204; 310/52; 310/72; 318/716
[58] Field of Search ................... 310/10, 180, 40, 184, 310/52, 261, 72, 264, 198–208, 265, 64, 214, 68; 318/514, 515, 516

[56] References Cited

U.S. PATENT DOCUMENTS

| | | | |
|---|---|---|---|
| 3,242,418 | 3/1966 | Mela | 310/40 |
| 3,470,396 | 9/1969 | Kafka | 310/10 |
| 3,742,265 | 6/1973 | Smith | 310/52 |
| 3,743,867 | 7/1973 | Smith | 310/52 |
| 3,781,578 | 12/1973 | Smith | 310/52 |
| 3,816,780 | 6/1974 | Smith | 310/52 |
| 3,999,091 | 12/1976 | Kirtley | 310/52 |

Primary Examiner—R. Skudy
Attorney, Agent, or Firm—J. W. Keen

[57] ABSTRACT

A superconductive field winding is provided for the rotor of a dynamoelectric machine. The winding consists of a number of multi-turn coils of a superconductive conductor which are wound about the periphery of the rotor thereby defining at least one pole pair. Selected coils of each pole pair are series-connected in groups of two coils or more and all of the series connected coil groups are connected in parallel one to another. Resistance elements connected in series with the parallel connected coils cause the current density of coil conductors disposed in regions of high field intensity to be reduced in relation to the current density of conductors lying in regions of low field intensity, thereby allowing the use of higher source current. A net increase in the useful external magnetic field is therefore obtained for a given amount of superconductive material.

5 Claims, 7 Drawing Figures

SUPERCONDUCTIVE WINDING

This is a continuation of application Ser. No. 538,289 filed Jan. 2, 1975, now a Defensive publication No. 945,002.

BACKGROUND OF THE INVENTION

1. Field of the Invention

This invention relates generally to windings for electrical machinery, and more specifically, to a superconductive field winding for the rotor of a dynamoelectric machine.

2. Description of the Prior Art

The idea of using superconducting windings in high power electrical machinery is well known in the art. Only recently, however, have materials been found which are capable of remaining in the zero resistance condition at high transport current densities and large direct current magnetic fields. For example, the development of the intrinsically stable multifilamentary superconductor has made it possible to build stable superconducting field windings with relatively high direct current densities. The use of superconductive direct current field windings allows a considerable increase in the field magnetomotive force generated by the windings and greatly increased flux densities in the active air gap of the machine. This increase in flux density obtains considerably increased power density and consequential reduction in the weight and volume of the machine. The size and weight reductions make superconducting machines attractive for such applications as electric drive ship propulsion systems. Also, higher ratings for turbine generators can be obtained without prohibitive increases in frame size.

It is useful to consider the phenomenon of superconductivity and the related properties of superconductive materials in order that the present invention may be clearly understood. Superconductivity is the state in which some metals offer no resistance to current and therefore do not generate heat as do normal conductors. The resistance at superconducting temperature is not merely extremely low, it is exactly zero. Superconductivity occurs only at very low temperatures; the temperature is different for each material and is known as the transition or critical temperature, $T_c$. At the transition temperature, which is a few degrees above absolute zero, there occurs a thermodynamic transition into the superconducting state. The transition temperature, in the absence of a magnetic field, is 3.7° Kelvin for tin, 7.3° Kelvin for lead, and 8° Kelvin for niobium. For further information on specific properties, see National Bureau of Standards Technical Note 724, "Properties of Selected Superconductive Materials," 1974 Supplement, published by the U.S. Dept. of Commerce.

In addition to temperature, the strength and geometry of magnetic fields affects superconducting materials. A material will suddenly lose its superconductivity in a high strength magnetic field, even a self-generated field, when it reaches a value known as its critical magnetic field, $H_c$. There also exists a critical electrical current density, $J_c$, which is dependent upon both the temperature and the magnetic field. The three parameters T, H, and J define a three dimensional surface which separates the superconducting and normal regions as illustrated in FIG. 1 of the drawing. For a given temperature (shaded region of FIG. 1) a superconducting coil will have some design load line as illustrated and an operating point P' chosen to be less than the critical point P, where a normal transition occurs. This return to the normal state is referred to as a quench. It should be understood that while the shape of the critical curves for any superconductive material is generally as indicated in FIG. 1, the intercepts at the axes are determined by the properties of the material selected.

Superconductors which are suitable for high current density, high field applications (usually called type II or hard superconductors) are subject to instabilities, where a small disturbance in operating conditions can cause a quench, even though the critical current density, magnetic field, or temperature is not exceeded except in a very small region of the coil. The current carrying capability of a single superconductor is limited by the maximum field seen at any point on the conductor. The current rating of a superconductive winding will therefore be greatly reduced by a high flux concentration even in a small region of the winding. Thus a serious problem involved in superconducting windings is the maintenance of superconductivity under magnetic field conditions which tend to destroy superconductivity. An equally important consideration is that of obtaining the maximum useful external field available from a given amount of superconductive material, once operating stability is achieved.

A known technique for preventing premature normalization due to non-uniform field conditions is to divide the superconductor into many fine filaments embedded in a high electrically and thermally conductive material such as high purity copper. The entire conductor is usually twisted about its axis to reduce eddy current losses. The copper dissipates heat from any small portion of the superconductor that may happen to normalize, thus preventing a stray normalization from heating the strands and causing destruction of the superconductivity throughout the coil. Such a superconductor has been described by G. H. Morgan in "Theoretical Behavior of a Twisted Multicore Superconducting Wire in a Time-Varying Uniform Magnetic Field," Journal of Applied Physics, August 1970, Vol. 41, page 3673. The amount of copper used in this technique is usually between one and three times the amount of superconductor. Although the use of copper increases operating stability, it has the undesirable effect of significantly reducing the overall current density, particularly when the ratio of copper to superconductor is increased to a proportion greater than 3:1. Thus there exists practical limitations on the use of the copper dissipation technique.

It is known in the art to reduce the current flow in superconductors disposed within regions of high magnetic field intensity by means of resistance elements so that critical current density values are not exceeded. However, a winding structure for the rotor of a dynamoelectric machine which utilizes resistance elements in this manner has not been disclosed.

The known way to connect a superconducting field winding is to connect all parts of the winding in series with all conductors carrying the same current density of a predetermined magnitude. The magnetic field produced by the series connected winding arrangement is not uniform, and the current in the winding may be increased only until current flow in the point, or points, at which the field is greatest reaches the critical value for the destruction of superconductivity. It is the principal object of the present invention, therefore, to provide a superconductive direct current field winding structure for the rotor of a dynamoelectric machine such that at points of high field intensity, the current density in the superconductive portions may be reduced, while at points of lower field strength it may be increased, thereby preventing normalization while producing a net increase in the useful external field.

SUMMARY OF THE INVENTION

The present invention provides a superconductive field winding arrangement in which the quenching effect of a non-uniform field distribution is minimized. This result is accomplished by a winding structure which includes a plurality of multi-turn superconductive coils which are angularly spaced, preferably in a symmetrical pattern about the periphery of a core, thereby defining at least one magnetic pole pair. The geometry of the magnetic field produced by such structures is generally symmetrical with relatively high intensity regions coinciding with each pole and regions of relatively low field intensity disposed between poles. Corresponding coils which lie in regions of substantially equal field intensity are connected in series electrical relationship one to another and therefore carry the same current. The series connected coil groups are connected in parallel electrical relationship so that all coils may be energized by a common direct current source.

Small current dividing resistance elements are placed in series with each series connected coil group so that the current density in those coils may be reduced or increased according to the intensity of the surrounding magnetic field. The winding can then be energized by a greater source current than could be used in a conventional series connected arrangement. Operating points are established which lie within superconducting J-H space and which may be located arbitrarily near the critical point where a normal transition occurs. Therefore a net increase in the useful external field for a given amount of superconducting material is obtained and operating stability is assured.

BRIEF DESCRIPTION OF THE DRAWINGS

The invention will be more fully understood from the following detailed description taken in connection with the accompanying drawing in which.

DESCRIPTION OF THE PREFERRED EMBODIMENT

Figure 1:
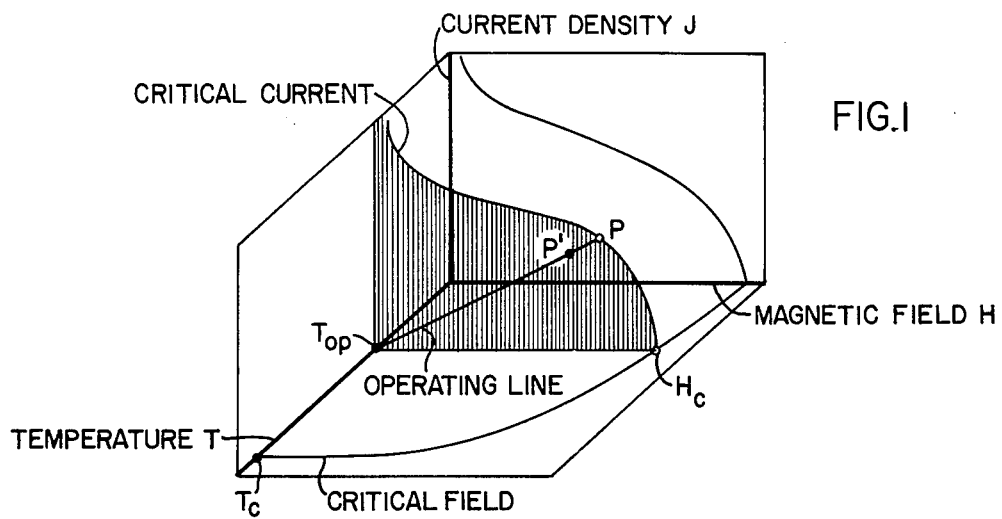
FIG. 1 is a graphical illustration of the relationship between temperature, magnetic field, and current density for a superconductor.

Throughout the description which follows, like reference characters refer to like elements on all figures of the drawing.

Figure 2:
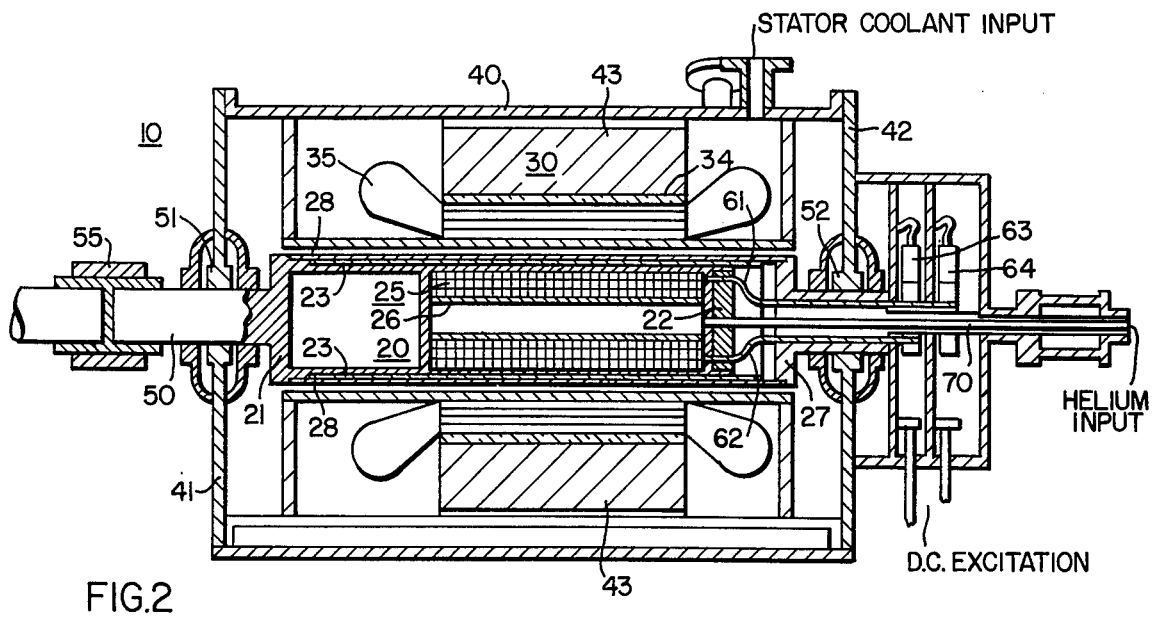
FIG. 2 is a cross-sectional veiw of a dynamoelectric machine in which the present invention is incorporated.

Referring now to the drawing, FIG. 2 illustrates a synchronous generator having a superconductive rotor field winding which is constructed in a manner to be hereinafter described. The generator 10 comprises a rotor assembly 20 and a stator assembly 30 which are enclosed in a housing 40. The housing 40 is generally cylindrical in shape and is closed by endplates 41 and 42. A shaft 50 is mounted in the housing by bearings 51 and 52. The bearings 51 and 52 are conventional and are positioned at each end of the housing 40 to support the shaft 50 for rotational movement by a prime mover (not shown). A flexible drive coupling 55 is used to isolate prime motor motions from the rotor 20.

The rotor assembly 20 comprises a superconductive direct current field winding 25 which is wound about a nonferromagnetic core 26. The stator 30 supports a non-superconductive winding 35. The stator winding 35 is adapted for multi-phase alternating current output, and the rotor field winding 25 is adapted for connection to a direct current source (not shown) for the excitation of the generator. The direct current electrical energy is supplied to the winding 25 by means of appropriate slip ring assemblies 63 and 64.

Figure 3:
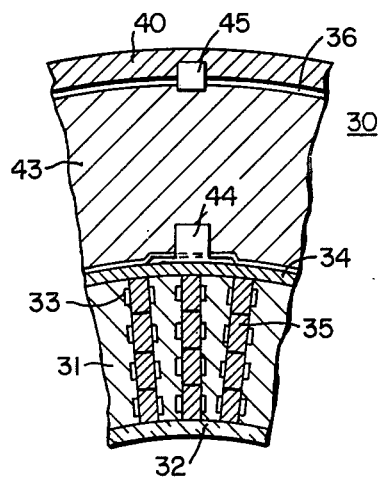
FIG. 3 is a cross-sectional view of a portion of the stator of the machine of FIG. 1 taken along a plane transverse to its axis.

A typical cross section through the stator assembly 30 is shown in FIG. 3. Because of the high flux sweeping the armature, the stator windings are fabricated in an unconventional design from finely stranded litz wire. The stator windings 35 are disposed between non-conducting stator teeth 31 to minimize any eddy current losses. The stator coils are wound on a cylindrical Micarta bore each 32 and are bonded with fiberglass 34 on the outside surface to provide a strong non-conductive support. The stator assembly 30 is attached to an iron flux shield 43 by means of a key 44. The iron flux shield 43 is fabricated from silicon iron laminations which are stacked and which are connected to the stator frame 40 by means of a key 45. The flux shield 43 provides a symmetrical return path for the magnetic flux generated by the stator windings 35.

Cooling of the stator assembly is accomplished by passing oil on the outside of the conductor insulation through cooling ducts 33 located outside of the coil insulation. The oil flow is directed from one end turn area through the active length in the cooling ducts 33 which are machined in the teeth 31. The flow then passes from the other end turn area to a cooling annulus 36 between the iron shield 43 and the frame 40 for cooling the iron shield after the oil is discharged from the stator 30. An inner water cooling arrangement may be used instead of the oil arrangement for increased power operation.

Figure 4:
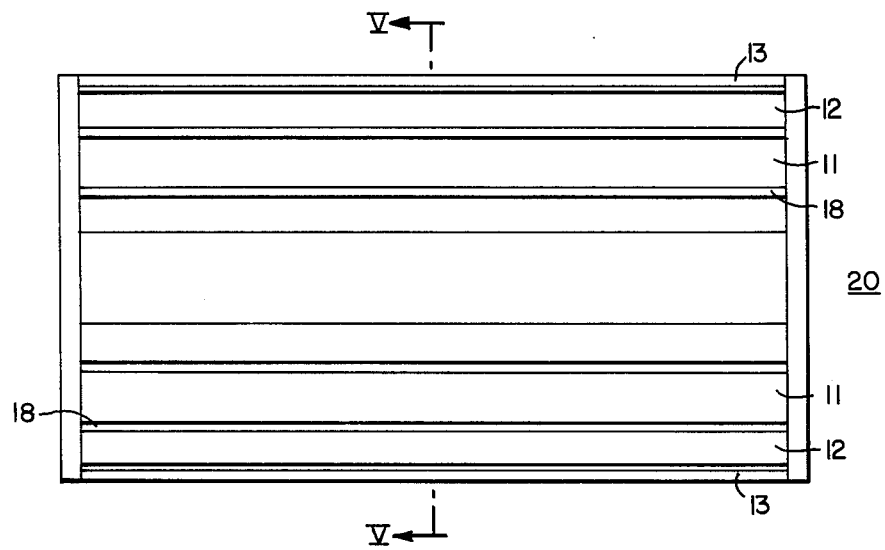
FIG. 4 is a side elevational view of the rotor of the machine illustrated in FIG. 1 upon which a superconducting winding is disposed.
Figure 5:
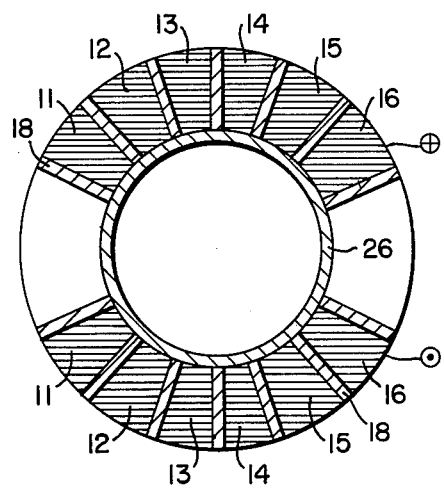
FIG. 5 is a cross-sectional view of the rotor of FIG. 4 taken along line V—V.

The rotor design is shown conceptually in FIGS. 2, 4, and 5. The rotor winding 25 is comprised of composite conductors made of a superconductive material such as niobium-titanium (Nb-Ti) alloy. It consists of a plurality of fine filaments, each filament being approximately 40 microns or less in diameter. The filaments are embedded in a copper matrix and are twisted about the composite axis. The entire composite is covered with a thin layer of enamel insulation.

Referring now to FIGS. 2 and 4, the superconductive winding 25 is disposed according to the teachings of the present invention between non-magnetic wedge members 18 upon a cylindrical rotor tube 26. The rotor tube 26 is comprised of non-ferromagnetic material, such as stainless steel, which has high mechanical strength and good ductility at superconducting temperatures. By "non-ferromagnetic material" it is meant a substance whose relative permeability is approximately one. The wedge members 18 cooperate with the outer surface of the tube 26 to support the individual coils of the winding 25 during rotation. Cooling to superconductive temperatures is provided by discrete ducts (not shown) disposed within the field winding 25. The cooling ducts direct the flow of a suitable cryogenic fluid, such as helium, from one end turn area through the active length of the winding to the opposite end turn area where it is collected. A highly polished gold plated radiation shield 23, maintained at 36° to 90° Kelvin by exhaust helium gas, is provided to intercept radial and axial radiation from the warm rotor structure. The rotor structure 20 and a dewar vessel 27 provided a barrier for the permanently sealed vacuum environment surrounding the field winding 25.

The winding 25 is supported by a long thin walled torque tube 21 on one end and a radial field support structure 22 on the other end. The machine torque transmitting structure is constructed from a non-ferromagnetic material having high mechanical strength and good ductility at superconducting temperatures such as austenitic stainless steel, Inconel alloy, or aluminum.

The field excitation leads 61, 62 are fabricated from stranded copper wire and connect the field winding 25 to the slip rings 63 and 64. Exhaust helium gas from the field winding is passed over the leads 61, 62 to reduce the conduction heat loss to the field winding.

The cylindrical dewar vessel 27 surrounds the radiation shield 23 and the superconductive winding 25 thereby providing a thermally non-conductive casing. The interior of the dewar vessel 27 is maintained at a temperature near to absolute zero by an appropriate cryogenic fluid such as helium. Due to the low boiling temperature of helium (approximately 4° Kelvin), it is generally preferred for the cryogenic fluid. The cryogenic fluid is introduced into the interior of the dewar vessel 27 through a conduit 70 which extends through the housing endplate 42. The conduit 70 is insulated to minimize heat transfer through the wall.

An eddy current damper shield 28 made of electrically conductive material such as aluminum or copper is located in the walls of the walls of the dewar vessel 27 or alternatively the shield may be located outside the dewar vessel. The eddy current damper shield aids in preventing penetration of the superconductive field winding by alternating current fields.

The superconducting field winding 25 shown in FIGS. 4 and 5 is a two pole winding and consists of six coils 11, 12, 13, 14, 15 and 16. All of the conductors in the upper half-plane of FIG. 5 carry current along the axis perpendicular to the cross section, and those in the lower half-plane are the return paths, carrying current in the opposite direction. Each of the coils consists of a plurality of superconductive turns disposed between wedge members 18 about the cylindrical, non-ferromagnetic rotor tube 26 which has an air core. The coils are preferably arranged symmetrically about the rotor tube 26 as shown in FIG. 5 in order to provide dynamic mechanical balance and to provide a symmetrical magnetic field distribution.

Figure 6:
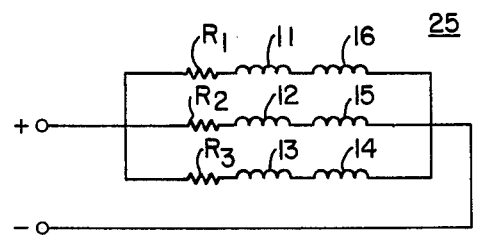
FIG. 6 is a schematic diagram of a typical winding embodying the invention.

In the illustrative embodiment shown in FIGS. 5 and 6, the coil 11 corresponds with the coil 16 with respect to the magnetic field surrounding each coil, i.e., assuming a symmetrical field distribution, the intensity of the magnetic field surrounding the coil 11 is substantially the same as the intensity of the magnetic field surrounding the coil 16. According to the present invention, the coils 11 and 16 are connected in series electrical relationship. Similarly, the coils 12 and 15 are connected together and the coils 13 and 14 are connected together in series electrical relationship. The series connected coil groups (11, 16), (12, 15) and (13, 14) are connected in parallel electrical relationship so that all coils may be energized by a common direct current source (not shown).

Resistance elements are utilized to divide the current among the parallel connect coil groups so that the current density can be reduced in regions of relatively high field intensity. Accordingly, in FIG. 6 resistance elements $R_1$, $R_2$, and $R_3$ are shown connected in series with the coil groups (11, 16), (12, 15) and (13, 14), respectively. The relative magnitude of each resistance element is determined by the division of current desired. The source current is divided through each coil pair according to the familiar resistance current divider rule. Since the direct current resistance of the superconductive coils is zero, the current dividing resistance elements can have very small resistances on the order of $10^{-7}$ to $10^{-8}$ ohms at the operating temperature and thus will have very low power dissipation. The resistance elements are preferably disposed within the low temperature environment surrounding the winding 25. The resistance elements should be symmetrically arranged about the end portion of the rotor to ensure dynamic mechanical balance. Exhaust helium gas is used to cool the resistance elements in the same manner as leads 61 and 62 are cooled in order to reduce the conduction heat loss to the field winding 25.

Figure 7:
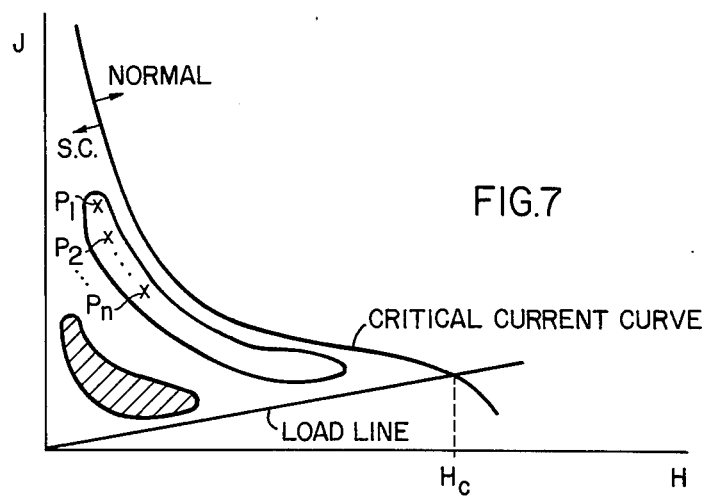
FIG. 7 is a graphical illustration of the operating points for the winding of FIG. 6.

Operation of a winding constructed according to the teachings of this invention is illustrated in FIG. 7. The operating range of a given load line is fixed by the J axis on the left and by a sloping line which intercepts the critical current curve at the critical field $H_c$ on the right. Two occupied zones of superconductive J-H space are illustrated for two different source currents. Given a sufficiently large source current, the operating points $p_1, p_2, \ldots p_n$ may be established wholly within superconducting J-H space, that is, to the left and below the critical current curve, at positions which lie arbitrarily near the critical current curve, according to the level of stability desired.

It will now be apparent that an improved superconductive winding arrangement has been provided for the rotor of a dynamoelectric machine in which the possibility of a quench due to a non-uniform magnetic field distribution has been reduced. By using such windings, a net increase in the useful external magentic field is obtained for a given amount of superconducting material since the current density of conductors within the winding may be increased or decreased according to the magnitude of the surrounding magnetic field. A particular embodiment of the invention has been shown and described for a purpose of illustration, but it should be understood that other arrangements and embodiments are possible and that the invention is applicable to windings having any desired number of poles and any number of coils.

What is claimed is:

1. A rotor of a dynamoelectric machine, said rotor comprising:
  a generally cylindrical rotor core structure;
  a plurality of multi-turn coils, said coils being disposed upon said core thereby defining at least one magnetic pole pair, selected coils of each pole pair being connected in series electrical relationship one to another to form coil groups, said coils selected for series connection being disposed within regions of substantially equal magnetic field intensity, said series connected coil groups being connected in parallel electrical relationship, and a plurality of resistance elements, said resistance elements being connected in series with said series connected coils, the magnitude of each resistance element being predetermined according to the intensity of the surrounding magnetic field.

2. The rotor of claim 1 wherein said coils are constructed from a superconductive material and are adapted for thermal contact with refrigeration means, said refrigeration means being adapted to induce and maintain a state of superconductivity in said coils under predetermined magnetic field and current density conditions.

3. The rotor of claim 1 wherein said resistance elements are adapted for thermal contact with refrigeration means, said resistance elements having a predetermined resistance at the operating temperature of said superconductive coil.

4. The rotor of claim 1 wherein said core comprises a hollow tube, said hollow tube being constructed from a non-ferromagnetic material having a relative permeability of approximately one.

5. The rotor of claim 1 wherein said coils are supported upon said core by a plurality of wedge members, said wedge members being affixed to said rotor structure and being extended radially therefrom.

* * * * *